US012187427B2

(12) United States Patent
Candelore et al.

(10) Patent No.: US 12,187,427 B2
(45) Date of Patent: Jan. 7, 2025

(54) RETRANSMISSION OF SIGNALS USING AERIAL VEHICLES

(71) Applicant: SONY GROUP CORPORATION, Tokyo (JP)

(72) Inventors: Brant Candelore, Poway, CA (US); Adam Goldberg, Fairfax, VA (US); Fred W Ansfield, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 236 days.

(21) Appl. No.: 17/869,685

(22) Filed: Jul. 20, 2022

(65) Prior Publication Data

US 2024/0025544 A1    Jan. 25, 2024

(51) Int. Cl.
*B64C 39/02* (2023.01)
*B64F 1/36* (2024.01)
*G05D 1/00* (2024.01)
*H04B 7/185* (2006.01)
*B64U 101/20* (2023.01)

(52) U.S. Cl.
CPC ............ *B64C 39/024* (2013.01); *B64F 1/364* (2013.01); *G05D 1/0022* (2013.01); *H04B 7/18504* (2013.01); *B64U 2101/20* (2023.01); *B64U 2201/20* (2023.01)

(58) Field of Classification Search
CPC ..... B64C 39/024; B64F 1/364; G05D 1/0022; H04B 7/18504; B64U 2101/20; B64U 2201/20
See application file for complete search history.

(56) References Cited

U.S. PATENT DOCUMENTS

| 9,596,020 | B2 | 3/2017 | Frolov et al. | |
| 10,095,242 | B1 * | 10/2018 | Von Novak | G05D 1/0808 |
| 10,103,812 | B2 * | 10/2018 | Busche | H04B 7/18502 |
| 11,051,225 | B2 * | 6/2021 | Mueck | H04W 4/44 |

(Continued)

FOREIGN PATENT DOCUMENTS

| WO | WO-2020263393 A9 * | 2/2021 | B64C 39/024 |
| WO | WO-2022010393 A1 * | 1/2022 | G01S 11/10 |
| WO | WO-2022247475 A1 * | 12/2022 | |

OTHER PUBLICATIONS

Translation of WO-2022010393-A1 (Year: 2022).*

*Primary Examiner* — Frederick M Brushaber
(74) *Attorney, Agent, or Firm* — CHIP LAW GROUP

(57) ABSTRACT

An electronic apparatus and method for retransmission of signals using unmanned aerial vehicles (UAV) is disclosed. The electronic apparatus includes a controller to control a movement of a UAV to a location within a signal coverage area associated with a remote transmitter. The electronic apparatus further includes receiver circuitry disposed on the UAV to receive a first signal from the remote transmitter. The first signal corresponds to a first wireless communication standard. The electronic apparatus further includes a signal processor to process the first signal to obtain a second signal and transmission circuitry to control one or more antennas disposed on the UAV to transmit a beam of the second signal to an electronic device that includes one or more receivers. The second signal corresponds to a second wireless communication standard which is same as or different from the first wireless communication standard.

17 Claims, 10 Drawing Sheets

(56) References Cited

U.S. PATENT DOCUMENTS

| | | |
|---|---|---|
| 11,095,360 B2 | 8/2021 | Rahmes et al. |
| 2012/0235863 A1* | 9/2012 | Erdos .................. H01Q 3/00 |
| | | 342/359 |
| 2015/0142966 A1 | 5/2015 | Baran et al. |
| 2016/0046387 A1* | 2/2016 | Frolov .............. H04B 7/18506 |
| | | 244/59 |
| 2016/0050011 A1* | 2/2016 | Frolov .............. H04B 7/18506 |
| | | 455/431 |
| 2016/0050012 A1* | 2/2016 | Frolov .............. H04B 7/18504 |
| | | 455/431 |
| 2016/0156406 A1* | 6/2016 | Frolov ................ H04W 16/28 |
| | | 455/431 |
| 2016/0359330 A1* | 12/2016 | Jin ........................ H02J 7/35 |
| 2019/0009916 A1* | 1/2019 | Von Novak .......... H04B 10/807 |
| 2019/0300185 A1* | 10/2019 | Tang ....................... G08G 5/00 |
| 2021/0116941 A1* | 4/2021 | Lee ...................... B64D 27/24 |
| 2021/0240205 A1* | 8/2021 | Kwak ................... B64U 10/16 |
| 2022/0024483 A1* | 1/2022 | Choi ..................... G08G 1/162 |
| 2023/0121483 A1* | 4/2023 | Stenneth .............. H04W 4/027 |
| | | 701/117 |

\* cited by examiner

RETRANSMISSION OF SIGNALS USING AERIAL VEHICLES

CROSS-REFERENCE TO RELATED APPLICATIONS/INCORPORATION BY REFERENCE

None.

FIELD

Various embodiments of the disclosure relate to signal retransmission and amplification for mobile and static receivers. More specifically, various embodiments of the disclosure relate to an electronic apparatus and method for retransmission of signals using aerial vehicles.

BACKGROUND

Advancements in the field of wireless communication have led to development of various technologies that allow transmission or reception of data through over-the-air (OTA) signals. For example, devices can receive data through Wi-Fi signals, Bluetooth® signals, radio signals, signals from terrestrial broadcast stations, signals from telecom base stations, satellite signals, and the like. Unlike wired communication, wireless communication requires the device to be present within a coverage area of a remote transmitter. In some cases, signals reception can be bad if the devices are in a difficult terrain or in a very remote location where there are very few transmitters. Additionally, certain signals, especially ones transmitted by a terrestrial transmitter, suffer from terrestrial interference or loss due to various obstacles, such as trees, hillsides, buildings, mountain ridges, and the like. Based on the wavelength and the size of obstacles, some signals suffer from diffraction. Lower frequencies may diffract around large obstacles, such as hills. Similarly, signals for cellular communication may be dominated by ground-plane effects as they travel over the rooftops of the urban environment. Such signals can then diffract over roof edges into the street, where they may suffer from multipath propagation, absorption, and other effects.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic apparatus and method for retransmission of signals using aerial vehicles is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementation may be found in the disclosed electronic apparatus and method of retransmission of signals using aerial vehicles. Exemplary aspects of the disclosure provide an electronic apparatus, which may provide a method of retransmission of signals using unmanned aerial vehicles. The electronic apparatus (which may be mounted on, for example, an unmanned aerial vehicle (UAV) such as a drone or a balloon tethered in air (below stratosphere)) may be configured to retransmit signals (such as a radio frequency (RF) signal or an optical signal) from one or more remote transmitters to one or more receivers disposed inside an electronic device, for example, a smartphone, a wearable device, a vehicle, an internet of things (IOT) device, and the like.

At any time-instant, the electronic apparatus may receive a first signal (for example, a cellular signal that carries cellular communication data, a satellite signal that carries geolocation data or media content, a radio frequency signal that carries the media content broadcasted by a terrestrial broadcast station, a Wi-Fi signal, or a Bluetooth® signal) from a remote transmitter based on a location that is within a signal coverage area associated with the remote transmitter. By way of example, and not limitation, the remote transmitter may be one of a base station of a cellular network, a satellite's transponder, a terrestrial broadcast station, a Wi-Fi router, a Wi-Fi repeater, a repeater for a cellular network, a Bluetooth® transmitter, or an optical transmitter that uses an optical signal for a point-to-point communication. Thereafter, the electronic apparatus may be configured to process the received first signal to obtain a second signal and may transmit, using one or more antennas, a beam of the second signal to the electronic device. The second signal may correspond to a wireless communication standard that may be same as or different from a wireless communication standard associated with the first signal. For example, both the first signal and the second may correspond to ATSC standard. With the retransmission of the first signal, the disclosed electronic apparatus may be able to provide satisfactory reception of signals (from remote transmitters), while avoid common issues related to terrestrial and/or atmospheric conditions that impact reception of signals over larger distances or over difficult terrains, such as hillsides, trees, buildings, or mountain ridges. In comparison to conventional solutions, the disclosure provides a way to provide cost effective and reliable wireless communication or reception between remote transmitter(s) and static/moving receivers on the ground.

Figure 1:
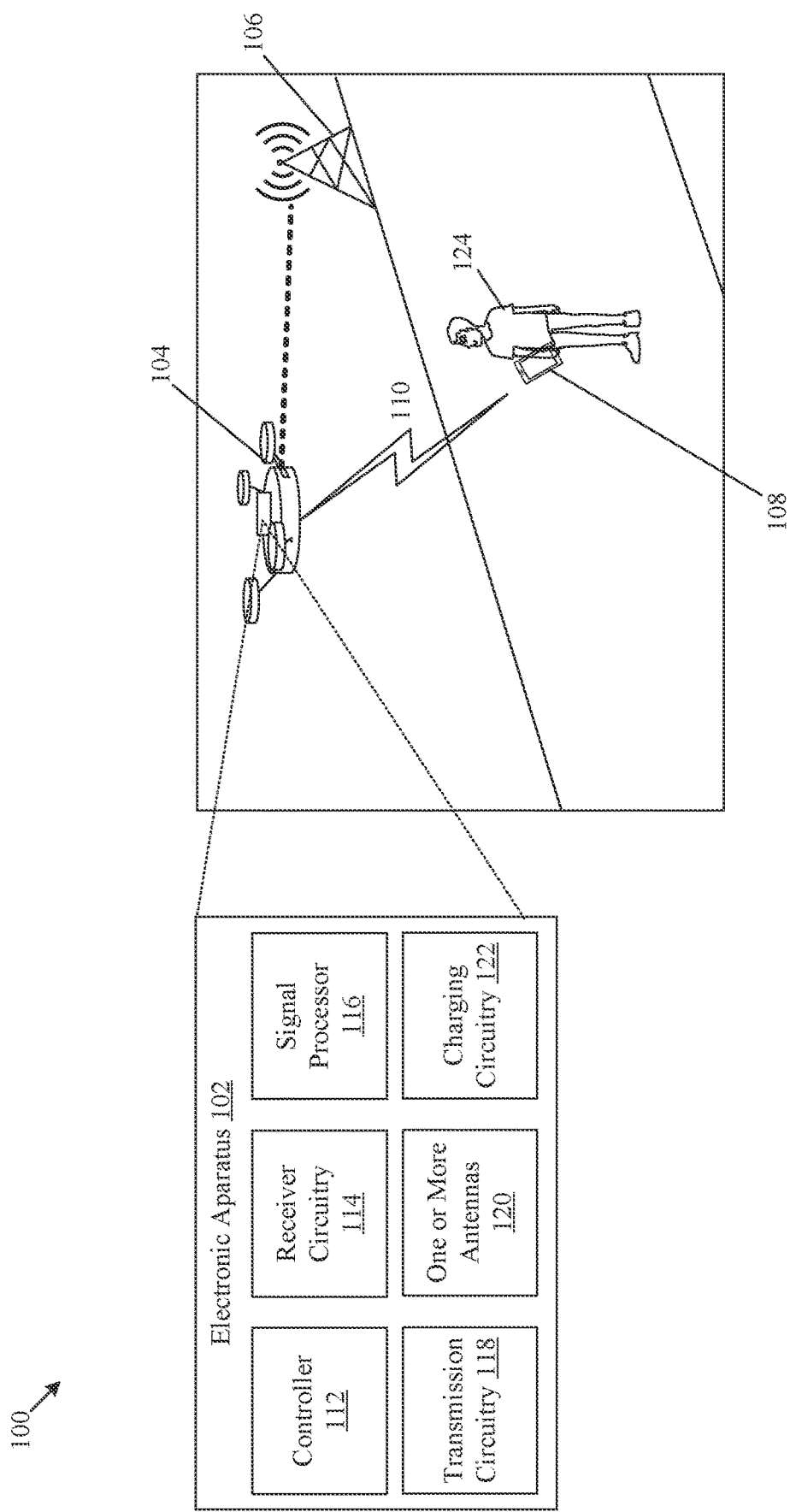
FIG. 1 is a diagram that illustrates an exemplary network environment for retransmission of signals using aerial vehicles, in accordance with an embodiment of the disclosure.

FIG. 1 is a diagram that illustrates an exemplary network environment for retransmission of signals using aerial vehicles, in accordance with an embodiment of the disclosure. With reference to FIG. 1, there is shown a network environment 100. The network environment 100 may include an electronic apparatus 102, a first Unmanned Aerial Vehicle (UAV) 104, a remote transmitter 106, and an electronic device 108. The electronic apparatus 102, the first UAV 104, the remote transmitter 106, and the electronic device 108 may communicate with each other, via one or more networks (e.g., a wireless communication network 110). The electronic apparatus 102 may include a controller 112, receiver circuitry 114, a signal processor 116, transmission circuitry 118, one or more antennas 120, and a charging circuitry 122. There is further shown a user 124 who may be associated with the electronic device 108.

The electronic apparatus 102 may include suitable logic, circuitry, interfaces, and/or code that may be configured to retransmit signals received from remote transmitter(s) (such as the remote transmitter 106) to one or more receivers (such as the electronic device 108). The electronic apparatus 102 may be mounted on an unmanned aerial vehicle (such as the first UAV 104) to allow the electronic apparatus 102 to move a location in airspace, from where the electronic apparatus 102 may receive signals from the remote transmitter(s) and may transmit signals (received from the one or more receivers on the ground) back to the remote receiver(s). Examples of the electronic apparatus 102 may include, but are not limited to, a signal repeater, a multi-band repeater, a wireless range extender for one or more bands of signals, a computing device which is coupled to a RF circuitry, an airborne stationary repeater, a balloon-lofted internet access platform, a smartphone, a cell phone, an optical repeater, or a communication device of the first UAV 104.

The first UAV 104 and other UAVs may be vehicles that may be configured to remain airborne for at least a duration of operation of the electronic apparatus 102. While airborne, the first UAV 104 may carry the electronic apparatus 102 and may operate as a static airborne vehicle or a moving vehicle that tracks remote transmitters (e.g., the remote transmitter 106) or receivers (such as the electronic device 108) to stay in a direct line-of-sight (LOS) for communication. Examples of the first UAV 104 may include, but are not limited to, a drone, a balloon tethered in air (below stratosphere), or any inanimate object that can remain airborne. In case the first UAV 104 is a balloon tethered in air, the electronic apparatus 102 may offer a one-way data communication and a two-way command and control.

The remote transmitter 106 may be configured to transmit a first signal associated with one or more service providers. In accordance with an embodiment, the remote transmitter may only broadcast the first signal. In accordance with another embodiment, the remote transmitter may also receive signals from remote receivers, such as the electronic apparatus 102. The first signal may correspond to, for example, an RF signal or an optical signal. The remote transmitter 106 may be associated with service provider(s) that may follow standard broadcasting protocols or a common channel broadcasting protocol. Examples of the service provider may include, but are not limited to, a satellite broadcaster, a terrestrial broadcaster, a digital television broadcaster, a cellular signal transceiver, or a Wi-Fi transceiver.

It should be noted that the remote transmitter 106 in FIG. 1 is presented merely as an example and such an example should not be construed as limiting for the disclosure. The present disclosure may be applicable to other implementations of the remote transmitter 106. Examples of the remote transmitter 106 may include, but are not limited to, a base station of a cellular network, a satellite's transponder, a terrestrial broadcast station, a Wi-Fi router, a Wi-Fi repeater, a repeater for a cellular network, a Bluetooth® transmitter, or an optical transmitter that uses an optical signal for a point-to-point communication.

The electronic device 108 may include suitable logic, circuitry, interfaces, and/or code that may be configured to receive a beam of a second signal (i.e., a retransmission or a repeated form of the first signal) via the transmission circuitry 118 of the electronic apparatus 102 that may be mounted on the first UAV 104. The electronic device 108 may include one or more RF antennas (not shown) to receive a beam of the second signal from the electronic apparatus 102.

In accordance with an embodiment, the electronic device 108 may be in a static state that corresponds to a fixed geo-location within a geographical area, for example, a camp site or a house in a remote location. In another embodiment, the electronic device 108 may be disposed inside or over a vehicle that may be in a moving state. For example, the electronic device 108 may be disposed inside a van, a bus, a boat, or a car.

It should be noted that the electronic device 108 in FIG. 1 is presented merely as an example and such an example should not be construed as limiting the disclosure. The present disclosure may be applicable to other implementations of the electronic device 108. Examples of the electronic device 108 may include, but are not limited to, a computing device, a smartphone, a mobile phone, a tablet, a laptop, a gaming device, a monitor, a set-top box, a mainframe machine, a server, a computer workstation, and/or a consumer electronic (CE) device.

The wireless communication network 110 may include a medium through which two or more wireless nodes of the plurality of wireless nodes may communicate with each other. For example, the wireless communication network 110 may include a medium through which the electronic apparatus 102 and/or other network devices in the wireless communication network 110 may communicate with each other. The wireless communication network 110 may be established in accordance with Institute of Electricals and Electronics Engineers (IEEE) standards for infrastructure mode (Basic Service Set (BSS) configurations), or in some specific cases, in ad hoc mode (Independent Basic Service Set (IBSS) configurations). The wireless communication network 110 may be established between different pairs of wireless nodes of the plurality of wireless nodes.

The wireless communication network 110 may be a Wireless Sensor Network (WSN), a Mobile Wireless Sensor Network (MWSN), a wireless ad hoc network, a Mobile Ad-hoc Network (MANET), a Wireless Mesh Network (WMN), a Wide Area Network (WAN), a Wireless Local Area Network (WLAN), a cellular network, a Long-Term Evolution (LTE) network, or an Evolved High Speed Packet Access (HSPA+), and the like. The wireless communication network 110 may operate in accordance with IEEE standards, such as 802 wireless standards or a modified protocol, which may include, but are not limited to, 802.3, 802.15.1, 802.16 (Wireless local loop), 802.20 (Mobile Broadband Wireless Access (MBWA)), 802.11-1997 (legacy version), 802.15.4, 802.11a, 802.11b, 802.11g, 802.11e, 802.11i, 802.11f, 802.11c, 802.11h (specific to European regulations) 802.11n, 802.11j (specific to Japanese regulations), 802.11p, 802.11ac, 802.11ad, 802.11ah, 802.11aj, 802.11ax, 802.11ay, 802.11az, 802.11hr (high data rate), 802.11af (white space spectrum), 802.11-2007, 802.11-2008, 802.11-2012, 802.11-2016.

For different pairs of wireless nodes, the wireless communication network 110 may be established to use different types of communication, such as a short-range communication or a long-range communication. The short-range communication may be a point-to-point communication, a point-to-point line-of-sight (LOS) communication, or a point-to-multipoint communication. Examples of protocols for the short-range communication may include, but are not limited to, Radio Frequency Identification (RFID), Wireless USB, Dedicated Short Range Communications (DSRC), and Near Field Communication (NFC) (e.g., NFC Peer-to-Peer), Bluetooth®, or Bluetooth® Low Energy (BLE). Other examples of protocols for the different types of communication may include, but are not limited to, ZigBee, Personal Area Network (PAN), Wi-Max, Wireless Metropolitan Area Networks (WMAN), and Local Multipoint Distribution Service.

The controller 112 may include suitable logic, circuitry, and/or interfaces that may be configured to control a movement of the first UAV 104 to a location within a signal coverage area associated with the remote transmitter 106. The controller 112 may be configured to control all components of the electronic apparatus 102. Examples of implementations of the controller 112 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or a combination thereof.

The receiver circuitry 114 may include suitable logic, circuitry, and/or interfaces that may be configured to receive a first signal from the remote transmitter 106. In case of point-to-point or point-to-multipoint communication, the receiver circuitry 114 may receive one or more signals from each of the electronic device 108 and the remote transmitter 106. As part of the electronic apparatus 102, the receiver circuitry 114 may be disposed on the first UAV 104. The receiver circuitry 114 may include, for example, one or more radio frequency (RF) antennas, one or more optical receivers (for free-space optical communication), downconverter(s), mixer(s), demodulator(s), demultiplexer(s), filter(s), and the like.

The signal processor 116 may include suitable logic, circuitry, interfaces, and/or code that may be configured to process the first signal (received from the remote transmitter 106) to obtain a second signal. Before the first signal can be retransmitted, the first signal may be processed through a set of signal processing operations to obtain the second signal. Such operations (for example, denoising operation, signal amplification, echo cancellation, signal regeneration, and the like) are well known to one skilled in the art and therefore, details of such operations are omitted from the disclosure for the sake of brevity. In accordance with an embodiment, the signal processor 116 may be a digital signal processor, an RF signal booster, an electro-optical repeater, an optical regenerator, and the like.

The transmission circuitry 118 may include suitable logic, circuitry, and/or interfaces that may be configured to transmit a beam of the second signal to the electronic device 108 or other receivers. The beam of the second signal may be transmitted via the one or more antennas 120. The transmission circuitry 118 may include, for example, one or more RF antennas (which may be same as those in the receiver circuitry 114), one or more optical receivers (for free-space optical communication), upconverter(s), mixer(s), modulator(s), multiplexer(s), filter(s), and the like.

The one or more antennas 120 may be configured to transmit and receive signals associated with the remote transmitter 106 and the electronic device 108. The one or more antennas 120 may be configured to receive a first signal from the remote transmitter 106 and may transmit a second signal to the electronic device 108. The second signal may be obtained from the first signal. The received first signal may include at least one of a RF signal or an optical signal. By way of example, and not limitation, each of the received first signal and the second signal may include a cellular signal that carries cellular communication data, a satellite signal that carries geolocation data or media content, a radio frequency signal that carries the media content (e.g., ATSC signal) broadcasted by a terrestrial broadcast station, a Wi-Fi signal, or a Bluetooth® signal. Examples of the one or more antennas 120 may include, but are not limited to, a directional antenna, a multiband antenna, a radio antenna, a quadrifilar antenna, a loop antenna, a patch or microstrip antenna, a phase-array antenna, a dipole antenna, a choke ring antenna, a helix antenna, or a planar ring antenna.

The charging circuitry 122 may include suitable logic, circuitry, interfaces, and/or code that may be configured to control a charging of batteries that may be included in the first UAV 104. In an embodiment, the charging circuitry 122 may be configured to receive a directed beam of optical energy from an optical power transmitter that may be included in the battery charger. In another embodiment, the charging circuitry 122 may be configured to receive electric power directly via cables from the battery charger coupled to a charging station.

In operation, the electronic apparatus 102 may receive a trigger input, for example, to turn-on the electronic apparatus 102 or to activate a mode. Based on the input, the electronic apparatus 102 may control a movement of the first UAV 104. In case the first UAV 104 is a balloon, the trigger input may inflate and/or release the balloon to a location (i.e., a static aerial location) within a signal coverage area of the remote transmitter 106 (below stratosphere). The trigger input may be directly received via an interface integrated into the electronic apparatus 102 and/or via the electronic device 108. For example, the electronic apparatus 102 may be configured to receive the trigger input, via an I/O device (shown in FIG. 2) or a network interface (also shown in FIG. 2) of the electronic apparatus 102.

In accordance with an embodiment, the electronic apparatus 102 may be configured to control a movement of the first UAV 104 to a location within the signal coverage area of the remote transmitter 106. The remote transmitter 106 may be, for example, a base station of a cellular network, a satellite's transponder, a terrestrial broadcast station, a TV transmitter (e.g., an ATSC or (Digital Video Broadcast) DVB transmitter), a Wi-Fi router, a Wi-Fi repeater, a repeater for a cellular network, a Bluetooth® transmitter, an optical transmitter that uses an optical signal for a point-to-point communication, and the like.

At the location, the electronic apparatus 102 may be configured to scan and detect a first signal from the remote transmitter 106. The remote transmitter 106 may or may not always be present in a direct LOS of the electronic device 108 (i.e., that includes receiver(s)). The location of the electronic apparatus 102 may be maintained such that the electronic device 108 on the ground is in a line-of-sight (LOS) of the electronic apparatus 102 (mounted on the first UAV 104). The control of the movement of the first UAV 104 is described, for example, in FIGS. 3A, 3B, and 3C.

The first signal may be an RF signal, or an optical signal transmitted by the remote transmitter 106. By way of example, and not limitation, the first signal may include a cellular signal that carries cellular communication data, a satellite signal that carries geolocation data, media content, or internet data, a radio frequency signal (e.g., a Digital Television (DTV) or Advanced Television Systems Committee (ATSC) signal) that carries the media content broadcasted by a terrestrial broadcast station, a Wi-Fi signal, or a Bluetooth® signal. The receiver circuitry 114 of the electronic apparatus 102 may receive the first signal from the remote transmitter 106, based on the location. The first signal may correspond to a first wireless communication standard and may be associated with a type of service provider, such as a satellite data provider, a cable TV service provider, a cellular service provider, an internet service provider, or any short/long-range, point-to-point, or point-to-multipoint communication service provider. The reception of the first signal is described, for example, in FIG. 3C.

After the reception, the signal processor 116 may be configured to process the first signal to obtain a second signal. The second signal may correspond to a second wireless communication standard, which may be same as or different from the first wireless communication standard associated with the first signal. By way of example, and not limitation, the second signal may be a cellular signal that carries cellular communication data, a radio frequency signal that carries the media content broadcasted by a terrestrial or satellite broadcast station, a Wi-Fi signal, or a Bluetooth® signal. While content of both the first signal and the second signal may remain same, the second signal may be processed for noise removal, amplification, and/or conversion to a form that may be suitable for a communication standard different from the one associated with the first signal. For example, if the first signal is a first ATSC signal that is received from the remote transmitter 106 (e.g., a terrestrial broadcast station), then the second signal may be a second ATSC signal or a Wi-Fi signal that carries the content of the ATSC signal received from the remote transmitter 106. As another example, if the first signal is a cellular signal (e.g., as per $4^{th}$ Generation LTE standard), then the second signal may be a Wi-Fi signal that carries the content of the cellular signal. The signal processing is described, for example, in FIG. 3C.

The transmission circuitry 118 of the electronic apparatus 102 may control the one or more antennas 120 disposed on the first UAV 104 to transmit a beam of the second signal to the electronic device 108 that includes one or more receivers. In accordance with an embodiment, the first wireless communication standard may correspond to a first frequency band and the second wireless communication standard may correspond to a second frequency band that may be different from the first frequency band. In such a case, the second signal may be transmitted in the second frequency band that may be different from the first frequency band in which the first signal is received from the remote transmitter 106. The control of the one or more antennas 120 is described, for example, in FIG. 3C.

In an exemplary scenario, the electronic device 108 used by the user 124 may face a weak signal coverage as the user 124 may be present in an environment that is either remote or includes a difficult terrain, such as hills, mountain ridges, or other terrestrial obstacles. In such a scenario, a user input may be provided to, for example, turn-on the electronic apparatus 102 or to activate a mode. Based on the user input, the electronic apparatus 102 may control the movement (i.e., a flight) of the first UAV 104 to a location within the signal coverage area of the remote transmitter 106. At the location, the electronic apparatus 102 (while disposed on the first UAV 104) may receive the first signal (e.g., a weak signal with a low SNR) from the remote transmitter 106 and may transmit the second signal (after processing the first signal to obtain the second signal) to the electronic device 108 that includes one or more receivers. The electronic apparatus 102 may transmit a directed beam of the second signal to one or more receivers included in the electronic device 108. Thus, the first UAV 104 and the electronic apparatus 102 may together operate to provide an effective and optimal signal reception for the electronic device 108 (for example, a mobile phone, a tablet, and the like) on the ground.

Figure 2:
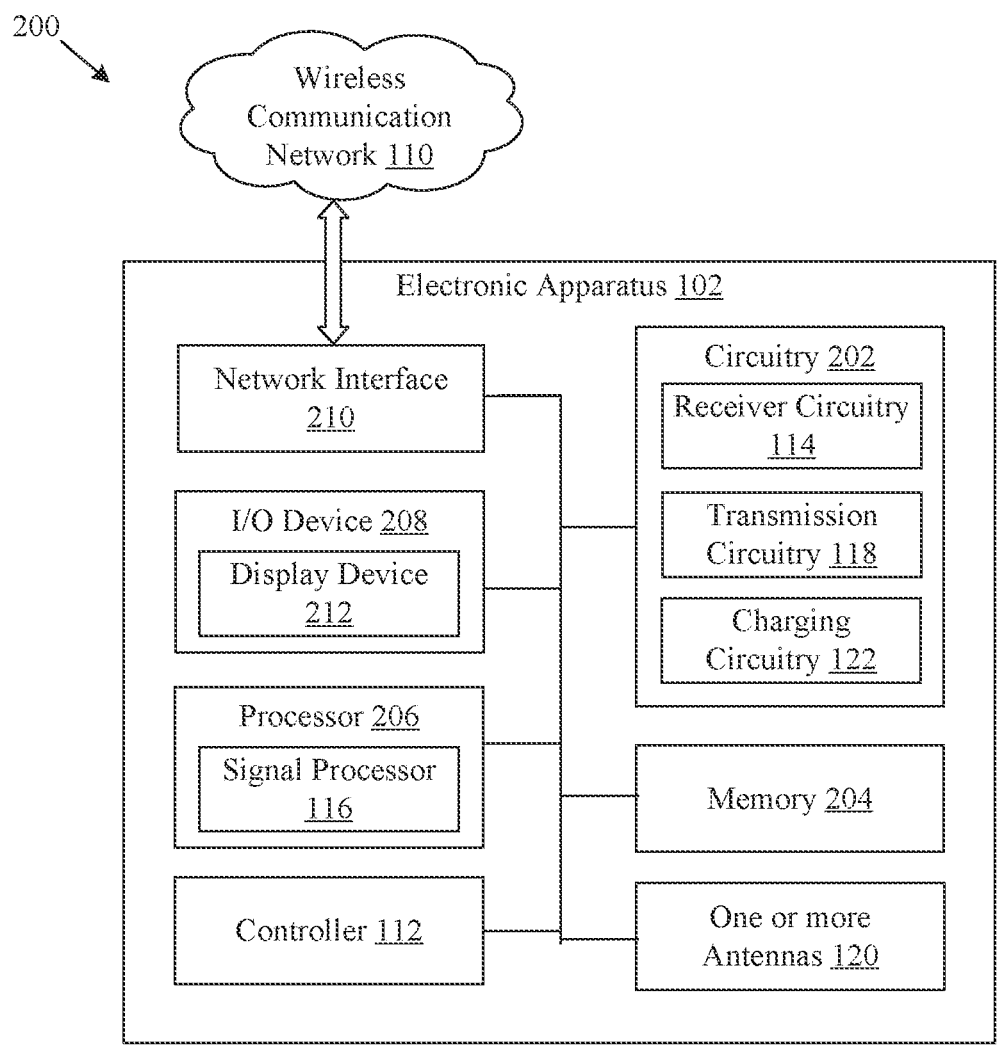
FIG. 2 is a block diagram that illustrates an exemplary electronic apparatus of FIG. 1, in accordance with an embodiment of the disclosure.

FIG. 2 is a block diagram that illustrates an exemplary electronic apparatus of FIG. 1, in accordance with an embodiment of the disclosure. FIG. 2 is explained in conjunction with elements from FIG. 1. With reference to FIG. 2, there is shown the electronic apparatus 102. The electronic apparatus 102 may include circuitry 202, a memory 204, a processor 206, an input/output (I/O) device 208, a network interface 210, one or more antennas 120, and a controller 112. The circuitry 202 may include the receiver circuitry 114, the transmission circuitry 118, and the charging circuitry 122. The processor 206 may include the signal processor 116. The I/O device 208 may include the display device 212. The network interface 210 may connect the electronic apparatus 102 with the remote transmitter 106 and the electronic device 108, via the wireless communication network 110.

The circuitry 202 may include suitable logic, circuitry, and/or interfaces that may be configured to execute program instructions associated with different operations to be executed by the electronic apparatus 102. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on several processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The memory 204 may be configured to store the first signal. The memory 204 may store speed information associated with the vehicle. The memory 204 may be further configured to store battery level of the first UAV 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The processor 206 may include suitable logic, circuitry, and interfaces that may be configured to execute a set of instructions stored in the memory 204. The processor 206 may be configured to execute program instructions associated with different operations to be executed by the electronic apparatus 102. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The I/O device 208 may include suitable logic, circuitry, interfaces, and/or code that may be configured to receive an input and provide an output based on the received input. The I/O device 208 may include various input and output devices, which may be configured to communicate with the circuitry 202. In an example, the electronic device 108 may display (via the display device 212 associated with the I/O device 208) the notification information corresponding to the battery level of the first UAV 104. Examples of the I/O device 208 may include, but are not limited to, a touch screen, a keyboard, a mouse, a joystick, a display device (for example, the display device 212), a microphone, or a speaker.

The display device 212 may include suitable logic, circuitry, and interfaces that may be configured to display notification information corresponding to the battery level of the first UAV 104. The display device 212 may be a touch screen which may enable a user to provide a user-input via the display device 212. The touch screen may be at least one of a resistive touch screen, a capacitive touch screen, or a thermal touch screen. The display device 212 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 212 may refer to a display screen of a head mounted device (HMD), a smart-glass device, a see-through display, a projection-based display, an electro-chromic display, or a transparent display.

The network interface 210 may include suitable logic, circuitry, interfaces, and/or code that may be configured to facilitate communication between the electronic apparatus 102, the first UAV 104, and the electronic device 108, via the wireless communication network 110. The network interface 210 may be implemented by use of various known technologies to support wired or wireless communication of the electronic apparatus 102 with the wireless communication network 110. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 210 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth®, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). Various operations of the circuitry 202 for retransmission of signals using unmanned aerial vehicles are described further, for example, in FIGS. 3A, 3B, 3C, 4A, 4B, 5, and 6.

Figure 3A:
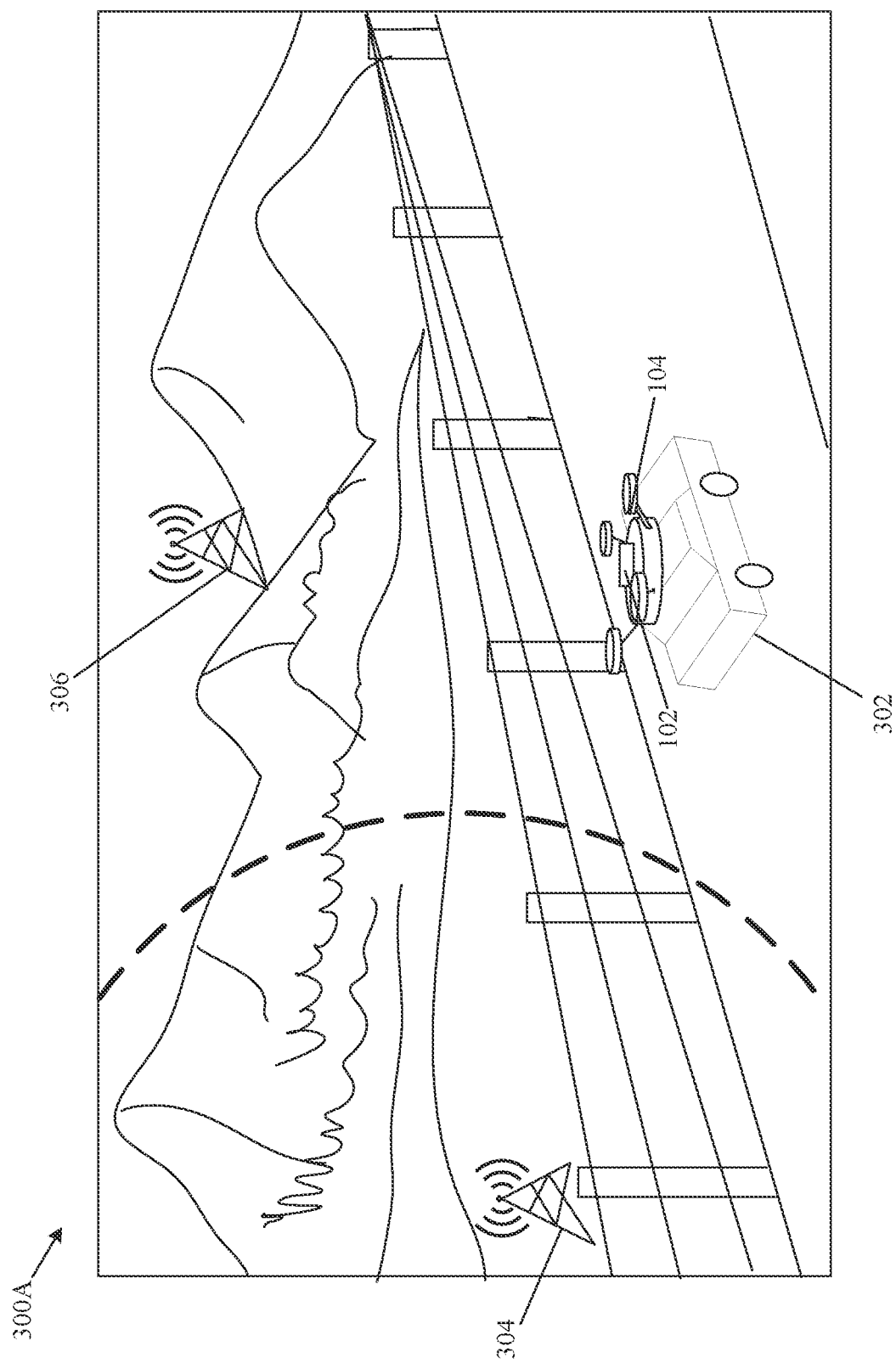
FIG. 3A is a diagram that illustrates an exemplary scenario for retransmission of signals using aerial vehicles, in accordance with an embodiment of the disclosure.

FIG. 3A is a diagram that illustrates an exemplary scenario for retransmission of signals using aerial vehicles, in accordance with an embodiment of the disclosure. FIG. 3A is described in conjunction with elements from FIGS. 1 and 2. With reference to FIG. 3A, there is shown an exemplary scenario 300A. The scenario 300A include a vehicle 302 in a moving state on a hilly terrain. There is further shown a first remote transmitter 304 and a second remote transmitter 306, which may be configured to have a similar functionality as the remote transmitter 106 illustrated and described in FIG. 1. It should be noted that the first remote transmitter 304 and the second remote transmitter 306, as shown in FIG. 3A, are presented merely as examples and such examples should not be construed as limiting for the disclosure. The present disclosure may be applicable to other types of the remote transmitter 106, for example, a base station of a cellular network, a satellite's transponder, an ATSC/DVB transmitter, a terrestrial broadcast station, a Wi-Fi router, a Wi-Fi repeater, a repeater for a cellular network, a Bluetooth® transmitter, an optical transmitter that uses an optical signal for a point-to-point communication.

In FIG. 3A, there is further shown a dash curve that indicates a boundary of a signal coverage area associated with the first remote transmitter 304. As shown, for example, the first UAV 104 may be initially docked at the vehicle 302. The electronic device 108 may be disposed inside or over the vehicle 302 (in a moving state). The vehicle 302 may be an autonomous, a semi-autonomous, or a non-autonomous vehicle, as defined, for example, by Society of Automotive Engineers (SAE) automation levels. Other example implementations of the vehicle 302 may include, but are not limited to, an electric vehicle, a hybrid vehicle, and/or a vehicle that uses a combination of one or more distinct renewable or non-renewable power sources. It should be noted that the vehicle 302 shown in FIG. 3A is presented merely as an example and such an example should not be construed as limiting the disclosure. The present disclosure may be also applicable to other types of the vehicle 302, for example a van, a bus, a car, a boat, or other forms of vehicles. A description of other types of vehicles has been omitted from the disclosure for the sake of brevity.

Figure 3B:
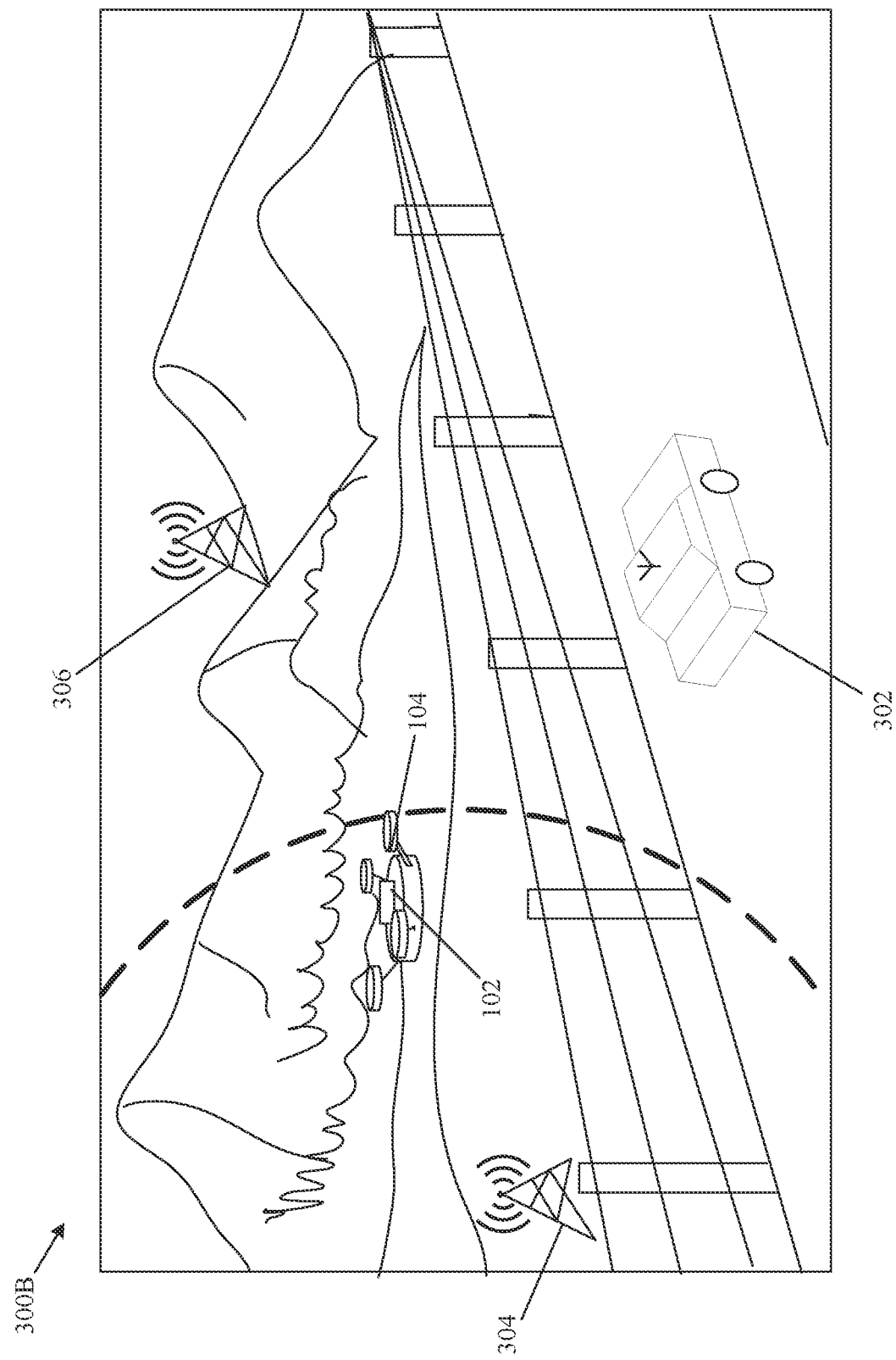
FIG. 3B is a diagram that illustrates an exemplary scenario for retransmission of signals using aerial vehicles, in accordance with an embodiment of the disclosure.

FIG. 3B is a diagram that illustrates an exemplary scenario for retransmission of signals using aerial vehicles, in accordance with an embodiment of the disclosure. FIG. 3B is described in conjunction with elements from FIGS. 1, 2, and 3A. With reference to FIG. 3B, there is shown an exemplary scenario 300B. The exemplary scenario 300B includes the vehicle 302 in the moving state on a hilly terrain. There is further shown the first remote transmitter 304 and the second remote transmitter 306, each of which may be configured to have a functionality that may be similar to or same as that of the remote transmitter 106, as illustrated and described in FIG. 1. There is further shown a dash curve that indicates a boundary of the signal coverage area associated with the first remote transmitter 304.

At any time-instant, the electronic apparatus 102 may receive a user input, via an I/O device 208 of the electronic apparatus 102. Based on the received user input, the controller 112 of the electronic apparatus 102 may control a movement of the first UAV 104 to a location within the signal coverage area associated with the first remote transmitter 304. The vehicle 302 may be present in the LOS of the first UAV 104, as shown in FIG. 3B. For example, in areas (such as hilly areas, camp sites, or any other remote location) where signal reception is poor, the electronic apparatus 102 may receive a user input signaling the first UAV 104 to fly to a location within the signal coverage area associated with the first remote transmitter 304. The location of the first UAV 104 may allow the electronic apparatus 102 to receive the first signal from the first remote transmitter 304, without much interference or loss from obstructions (such as hills, trees, or buildings).

Figure 3C:
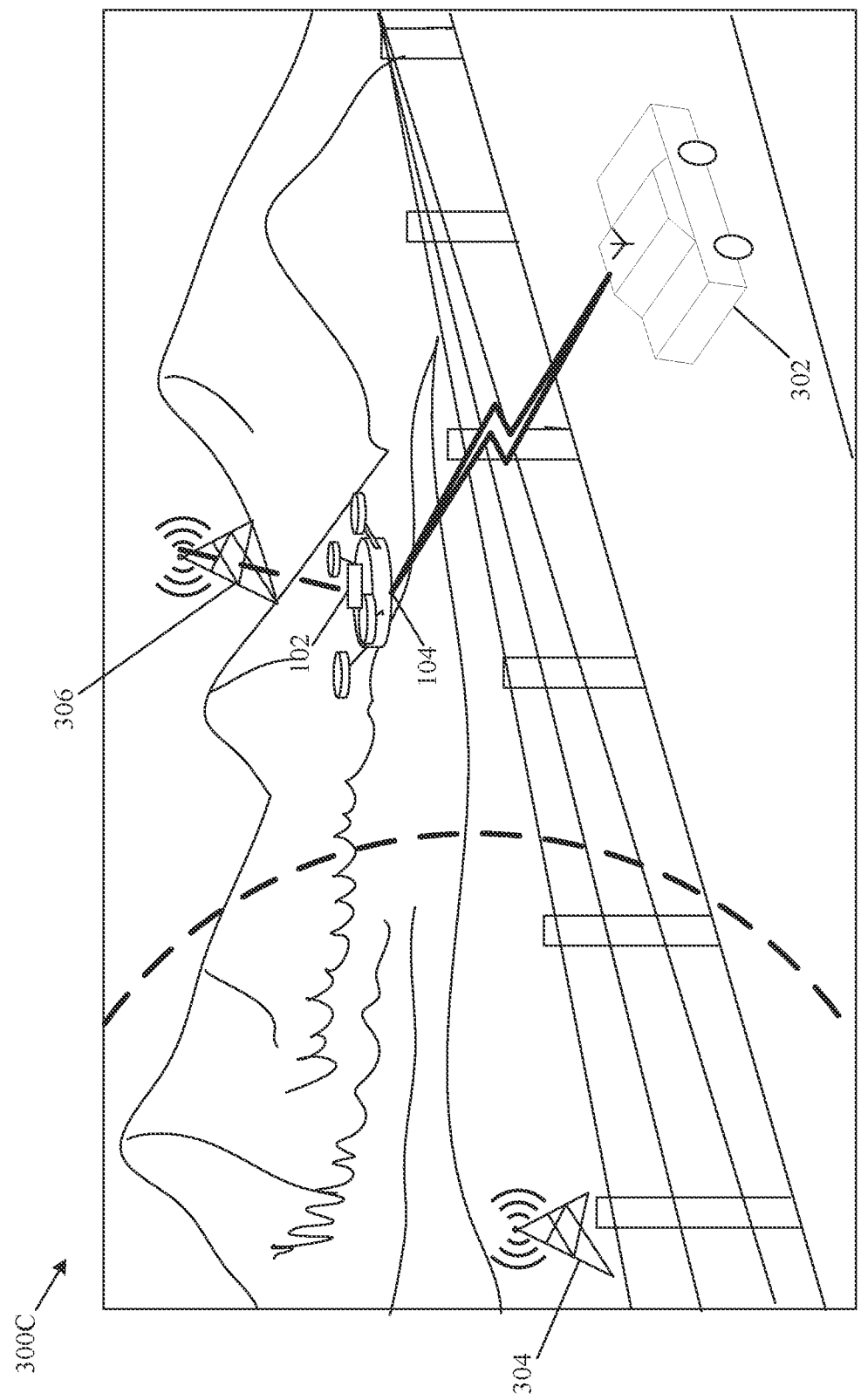
FIG. 3C is a diagram that illustrates an exemplary scenario for retransmission of signals using aerial vehicles, in accordance with an embodiment of the disclosure.

FIG. 3C is a diagram that illustrates an exemplary scenario for retransmission of signals using aerial vehicles, in accordance with an embodiment of the disclosure. FIG. 3C is described in conjunction with elements from FIGS. 1, 2, 3A and 3B. With reference to FIG. 3C, there is shown an exemplary scenario 300C. The exemplary scenario 300C includes the vehicle 302 in the moving state on a hilly terrain. There is further shown the first remote transmitter 304 and the second remote transmitter 306, each of which may be configured to have a functionality that is similar to the remote transmitter 106, as illustrated and described in FIG. 1. There is further shown a dash curve that indicates a boundary of the signal coverage area associated with the first remote transmitter 304.

At any time-instant, the vehicle 302 may exit a geographical region that falls within the signal coverage area of the first remote transmitter 304. The vehicle 302 may enter a geographical region that may fall within a signal coverage area of the second remote transmitter 306, as shown in FIG. 3C. However, there may be obstructions that may affect a stable, reliable, and direct communication (or just reception) between the electronic device 108 (mounted on the vehicle 302) and the second remote transmitter 306. The controller 112 may be configured to control a movement of the first UAV 104 to a location within the signal coverage area associated with the second remote transmitter 306.

The receiver circuitry 114 may be configured to receive a first signal from the second remote transmitter 306 based on the location. The first signal may correspond a first wireless communication standard and may be received as one of an RF signal or an optical signal (i.e., as per free-space laser communication). By way of example, and not limitation, the first signal may include a cellular signal that carries cellular communication data, a satellite signal that carries geolocation data or media content, a radio frequency signal that carries the media content broadcasted by a terrestrial broadcast station, a Wi-Fi signal, or a Bluetooth® signal. In accordance with an embodiment, the first signal may be an ATSC signal or a DVB signal.

Upon the reception of the first signal from the second remote transmitter 306, the signal processor 116 may be configured to process the received first signal to obtain a second signal. By way of example, and not limitation, the signal processor 116 may be configured to filter the first signal to remove noise and amplify the filtered signal. In case the received first signal is an optical signal, the signal processor 116 may receive an electrical signal based on conversion of the optical signal. As the first signal may be weak, the signal processor 116 may be required to increase the power of the received first signal while ensuring that the power gain improves the signal to noise ratio (SNR) of the received first signal.

In accordance with an embodiment, the signal processor 116 and/or other RF components may be configured to convert the first signal to the second signal such that the second signal corresponds to a wireless communication standard same as or different from the wireless communication standard associated with the first signal. By way of example, and not limitation, the second signal may include a cellular signal that carries cellular communication data, a satellite signal that carries geolocation data or media content, a radio frequency signal that carries the media content broadcasted by a terrestrial broadcast station, a Wi-Fi signal, or a Bluetooth® signal. In accordance with an embodiment, the second signal may be same as the first signals, i.e., an ATSC signal or a DVB signal. In such a case, the electronic apparatus 102 may operate as an ATSC-to-ATSC re-transmitter.

In some scenarios, the second signal may correspond to a wireless communication standard that may be different from the wireless communication standard associated with the first signal. As an example, the first signal may correspond to a cellular signal that carries cellular communication data and the second signal may correspond to a Wi-Fi signal that carries the same cellular communication data. As another example, the first signal may correspond to a cellular signal (i.e., first signal) that carries cellular communication data and the second signal may correspond to an RF signal other than the cellular signal. The RF signal may be same as the one used by a terrestrial broadcast station for DTV signals (such as ATSC signals). As another example, the first signal may correspond to an RF signal that carries media content (e.g., content over ATSC signals) broadcasted by a terrestrial broadcast station and the second signal may correspond to a Wi-Fi signal that carries the same media content. As another example, the first signal may correspond to a satellite signal that carries geolocation or internet data, and the second signal may correspond to a Wi-Fi signal that carries the same geolocation or the internet data. As another example, the first signal may correspond to a satellite signal that carries geolocation data and the second signal may correspond to an RF signal (other than a cellular signal). The RF signal may be same as the one used by a terrestrial broadcast station for DTV signals (such as ATSC signals).

In some scenarios, the second signal may correspond to a wireless communication standard that may be same as the wireless communication standard associated with the first signal. As an example, both the first and second signals may correspond to RF signals that carry the media content broadcasted by a terrestrial broadcast station (e.g., for ATSC 1.0/3.0 transmission). In such a case, the electronic apparatus 102 may operate as a broadcast repeater or a signal re-transmitter disposed on the first UAV 104.

After the signal processing, the transmission circuitry 118 may be configured to control the one or more antennas 120 disposed on the first UAV 104 to transmit a beam of the second signal to the electronic device 108 that includes one or more receivers. In accordance with an embodiment, the one or more antennas 120 may be a directional antenna that may be configured to receive the first signal from the second remote transmitter 306 and may transmit a directed beam of the second signal to one or more receivers of the electronic device 108 disposed on the vehicle 302. The directed beam may be transmitted to minimize a dispersal of the signal in free space.

In an embodiment, the electronic apparatus 102 may receive the first signal (such as a cellular signal or a satellite signal) from the remote transmitter 106 and may transmit signals (received from the one or more receivers on the ground) back to a remote receiver (that may be placed with or separate from the remote transmitter 106).

In accordance with an embodiment, the second signal may be transmitted in a second frequency band that may be different from a first frequency band in which the first signal is received. In such a case, the first wireless communication standard may correspond to the first frequency band and the second wireless communication standard may correspond to the second frequency band. As an example, if the first signal in the first frequency band is one of a satellite signal, a DTV signal, a Wi-Fi signal, a Bluetooth® signal, or an optical signal (over free space), then the second signal in the second frequency band may be an RF signal that uses whitespace signal frequencies (e.g., 50 MHz and 700 MHz).

In accordance with an embodiment, the controller 112 may be configured to receive speed information associated with the vehicle 302 from a data communication system associated with the vehicle 302. The data communication system may include suitable logic, circuitry, interfaces, and/or code that may enable the vehicle 302 to communicate with the electronic apparatus 102 (and the first UAV 104), via the wireless communication network 110. The data communication system may implement known technologies to support wired and/or wireless communication. The data communication system may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The functions of the data communication system may be same as the functions of the network interface 210 described, for example, in FIG. 2. Therefore, further description of the data communication system is omitted from the disclosure for the sake of brevity.

The vehicle 302 may include an in-vehicle network (not shown) to facilitate communication between internal components of the vehicle 302. A person of ordinary skilled in the art will understand that the vehicle 302 may also include other suitable components or systems, in addition to the components or systems illustrated herein to describe and explain the function and operation of the present disclosure. A description of such components or systems is omitted herein for the sake of brevity.

The vehicle 302 may include one or more sensors (not shown) to determine the speed information. The speed information associated with the vehicle 302 may be stored in a memory (local) or on a server. The speed information may include, for example, position information and a current speed of the vehicle 302. The one or more sensors may include at least one of a location sensor, a speed sensor, an inertial measurement unit (IMU), or an image sensor. Such sensors which may be configured to acquire the speed information.

Based on the speed information, the controller 112 may be configured to determine an expected position of the first UAV 104 with respect to that of the vehicle 302 at a time-instant. The expected position of the first UAV 104 may correspond to an optimal position that allows the first UAV 104 to have the vehicle 302 in a direct LOS and to directly transmit to the electronic device 108 mounted on the vehicle 302. Thereafter, the controller 112 may be further configured to determine a current position of the first UAV 104. The current position of the first UAV 104 may include a ground position, a docked position, or any other position within the signal coverage area at the time instant. It may be determined whether there is a difference between the current position of the first UAV 104 and the expected position of the first UAV 104 at the time instant. In case the difference is above a threshold, the controller 112 may be configured to control the movement of the first UAV 104 until the difference between the current position of the first UAV 104 and the expected position is a minimum. This may enable the first UAV 104 to continuously track the movement of the vehicle 302.

In accordance with an embodiment, the controller 112 may be configured to determine an expected relative speed of the first UAV 104 with respect to the vehicle 302 at a time-instant. The expected relative speed of the first UAV 104 may correspond to an optimum speed of the first UAV 104 with respect to a current speed of the vehicle 302. The expected relative speed of the first UAV 104 may be determined such that the first UAV 104 may remain within a signal coverage area of the first remote transmitter 304 while having the vehicle 302 (or the electronic device 108) in a direct LOS for signal transmission/reception. Thereafter, the controller 112 may be configured to determine a current relative speed of the first UAV 104. It may be determined whether there is a difference between the current relative speed of the first UAV 104 and the expected relative speed of the first UAV 104 at a time instant. In case the difference is above or below a threshold, the controller 112 may be configured to control the movement of the first UAV 104 until the difference between the current relative speed of the first UAV 104 and the expected relative speed is a minimum. This may enable the first UAV 104 to continuously track the movement (and follow a path) of the vehicle 302.

In an embodiment, the controller 112 may be configured to determine an expected speed with which the vehicle 302 is required to move with respect to that of the first UAV 104. The expected speed of the vehicle 302 may correspond to an optimum speed that the vehicle 302 must have to remain in a direct LOS of the first UAV 104. Thereafter, the controller 112 may be further configured to determine a current speed of the vehicle 302. It may be further determined whether there is a difference between the current speed of the vehicle 302 and the expected speed of the vehicle 302 at the time instant. In case the difference is above or below a threshold, the transmission circuitry 118 may be configured to transmit a message that may include a call to change a speed of the vehicle 302 to match the expected speed. By way of example, and not limitation, the message may include a text, a sound, or a graphic item that may prompt the user 124 to change the speed of the vehicle 302. The message may be displayed on a display device (for example, the display device 212) associated with the electronic device 108 or the vehicle 302.

Figure 4A:
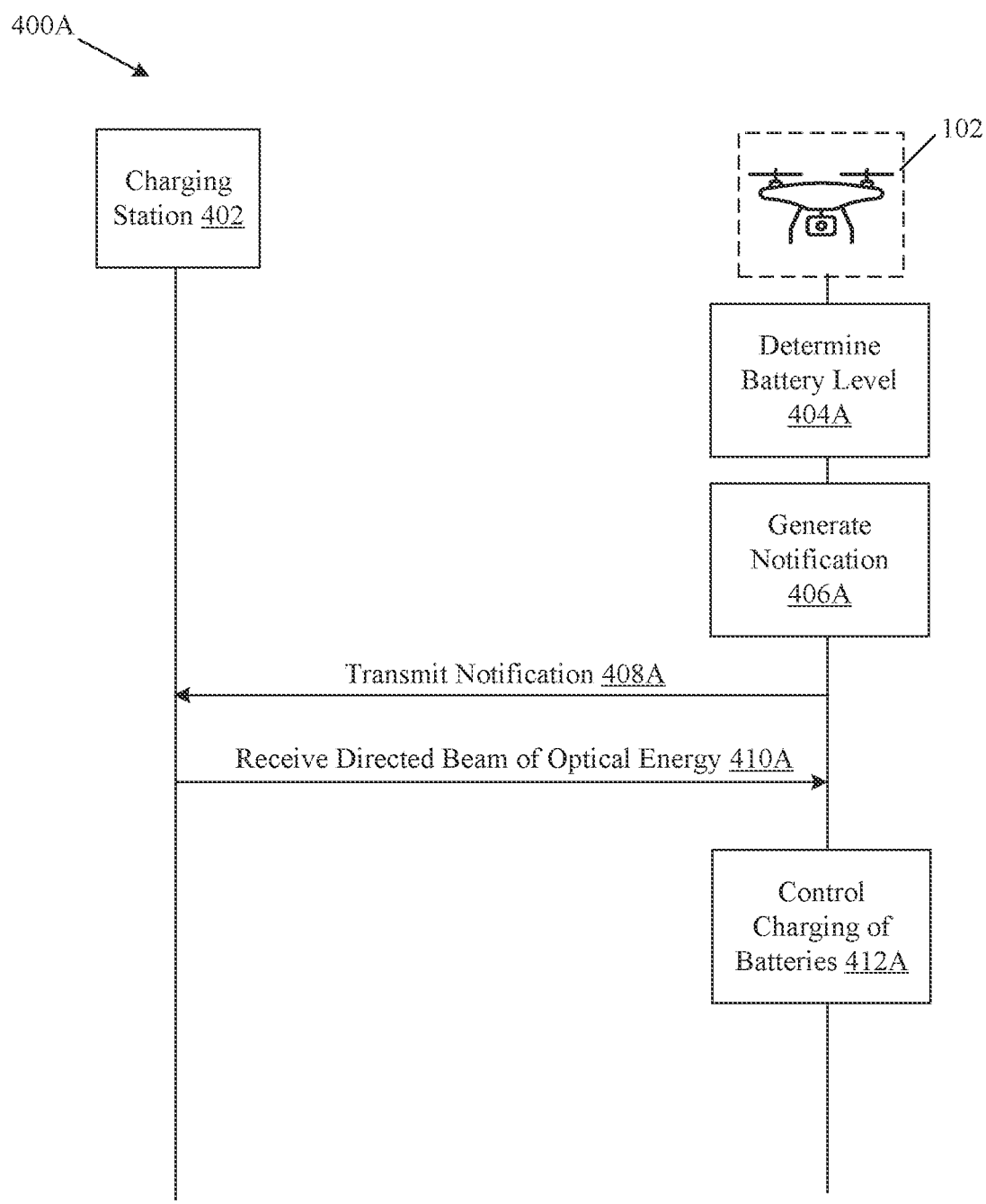
FIG. 4A is a diagram that illustrate exemplary operations for charging of aerial vehicles, in accordance with an embodiment of the disclosure.

FIG. 4A is a diagram that illustrate exemplary operations for charging of aerial vehicles, in accordance with an embodiment of the disclosure. FIG. 4A is explained in conjunction with elements from FIGS. 1, 2, 3A, 3B, and 3C. With reference to FIG. 4A, there is shown a timeline 400A that illustrates exemplary operations from 404A to 412A. The exemplary operations may be executed by any computing system, for example, by the electronic apparatus 102 and/or the charging circuitry 122 of FIG. 1.

The electronic device 108 may be disposed in a location that includes a charging station 402 and a battery charger (not shown) coupled to the charging station 402. The charging station 402 may include suitable logic, circuitry, and/or interfaces that may be configured to facilitate a transfer of electrical energy from a battery charger to the first UAV 104. The charging station 402 may be also configured to process and monitor the transfer of electrical energy. In some embodiments, the charging station 402 may include one or more power sources (e.g., a battery pack) coupled to the battery charger.

In an embodiment, the charging station 402 and the battery charger may be in a public location (such as a public park or a gas station) for the transfer the electrical energy. The battery charger may employ a charging cable, a wireless charging circuit, or an optical power transmitter (fiber-based or free-space) for the transfer of the electrical energy. In another embodiment, the charging station 402 may be in a private location (such as a charging adapter located at home of the user or in a specific location in the vehicle 302) to transfer the electrical energy to the first UAV 104. The battery charger may include suitable logic, circuitry, or interfaces that may be configured to charge one or more batteries of the first UAV 104.

At 404A, a battery level of the first UAV 104 may be determined. In an embodiment, the controller 112 may be configured to determine a battery level of the first UAV 104. The first UAV 104 may include one or more sensors (not shown) to determine operational information associated with the first UAV 104. The operational information may include, for example, a battery level of the first UAV 104, a battery charging indicator, a low charge indicator, a speed of the first UAV 104, and the like. The battery level of the first UAV 104 may indicate an amount of charge left in the first UAV 104. Based on the determined battery level of the first UAV 104, the controller 112 may be configured to determine whether the battery level (e.g., a percent value or a numeric value) is less than a threshold. The threshold may be a percent value (such as 60%, 70%, 75%, or any other percent value between 0% and 100%) or a numeric value (such as 0.6, 0.7, 0.75, or any other numeric value) between 0 and 1.

In an embodiment, the controller 112 may be configured to receive a user input via the I/O device to set the threshold. Without a user input, the battery level may be compared with a default threshold. If the determined battery level is less than the threshold, the control may pass to 406A. Otherwise, if the determined battery value is greater than the threshold, the control may pass to end.

At 406A, notification information may be generated. In an embodiment, the controller 112 may be configured to generate the notification information based on a determination that the battery level is below the threshold. The notification information may include a text that may indicate a message for the user 124 to charge a battery of the first UAV 104 or replace the battery of the first UAV 104. The message may be displayed on a display device (for example, the display device 212) associated with the electronic device 108.

At 408A, the notification information may be transmitted. In an embodiment, the controller 112 may be configured to transmit the generated notification information to the charging station 402. The transmission circuitry 118 may be further configured to transmit the generated notification information that indicate a low battery level of the first UAV 104 to the charging station 402.

At 410A, a directed beam may be received. In an embodiment, the charging circuitry 122 may be configured to receive a directed beam of optical energy from an optical power transmitter included in the battery charger. The charging station 402 may be configured to transmit the directed beam (such as a laser beam) of the optical energy from the optical power transmitter (such aa a high-power laser) to the charging circuitry 122.

At 412A, charging of batteries may be controlled. In embodiment, the charging circuitry 122 may be configured to control a charging of one or more batteries included in the first UAV 104. The one or more batteries may power the first UAV 104 and may enable operation of various components of the first UAV 104. The battery may be a source of electric power for one or more electric circuits of the first UAV 104. For example, the battery may be a source of electrical power to the circuitry 202, the memory 204, the network interface 210, the propulsion system, the location sensor, and the speed sensor.

Figure 4B:
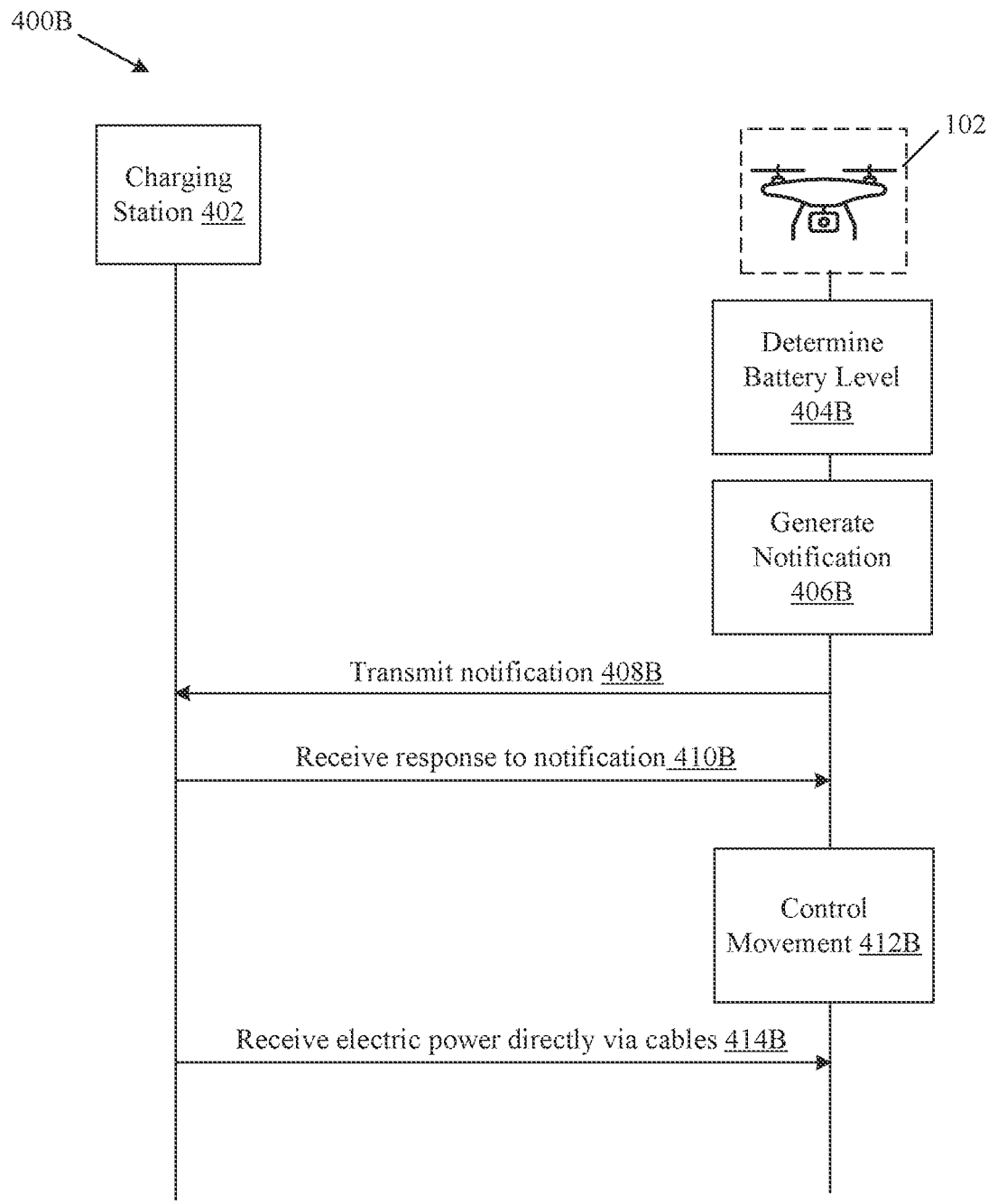
FIG. 4B is a diagram that illustrate exemplary operations for charging of aerial vehicles, in accordance with an embodiment of the disclosure.

FIG. 4B is a diagram that illustrate exemplary operations for charging of aerial vehicles, in accordance with an embodiment of the disclosure. FIG. 4B is explained in conjunction with elements from FIGS. 1, 2, 3A, 3B, 3C, and 4A. With reference to FIG. 4B, there is shown a timeline 400B that illustrates exemplary operations from 404B to 414B. The exemplary operations may be executed by any computing system, for example, by the electronic apparatus 102 and/or the charging circuitry 122 of FIG. 1.

At 404B, a battery level of the first UAV 104 may be determined. In an embodiment, the controller 112 may be configured to determine a battery level of the first UAV 104, as described, for example, at 404A in FIG. 4A.

At 406B, notification information may be generated. In an embodiment, the controller 112 may be configured to generate notification information based on a determination that the battery level is below a threshold, as described, for example, at 406A in FIG. 4A.

At 408B, the notification information may be transmitted. In an embodiment, the controller 112 may be configured to transmit the generated notification information to the charging station 402, as described, for example, at 408A in FIG. 4A.

At 410B, a response may be received. In an embodiment, the controller 112 may be configured to receive the response to the notification information from the charging station 402. The controller 112 may be configured to receive a user input, via a I/O device (such as the I/O device 208) associated with the electronic device 108. The user input may be indicative of the response to the notification information. The response may include a permission to dock the first UAV 104 at the charging station 402.

At 412B, a movement of the first UAV 104 may be controlled. In embodiment, the controller 112 may be configured to control the movement of the first UAV 104 until the first UAV 104 is docked at the charging station 402. An advantage to control such a movement of the first UAV 104 may include minimization in dispersal of the transmitter energy and optimization of the power transfer.

At 414B, electric power may be received. In an embodiment, the charging circuitry 122 may be configured to receive the electric power directly via cables from the battery charger coupled to the charging station 402. The electric power may be received based on a determination that the first UAV 104 is docked at the charging station 402. The charging of the one or more batteries, is described, for example, at 412A in FIG. 4A.

Figure 5:
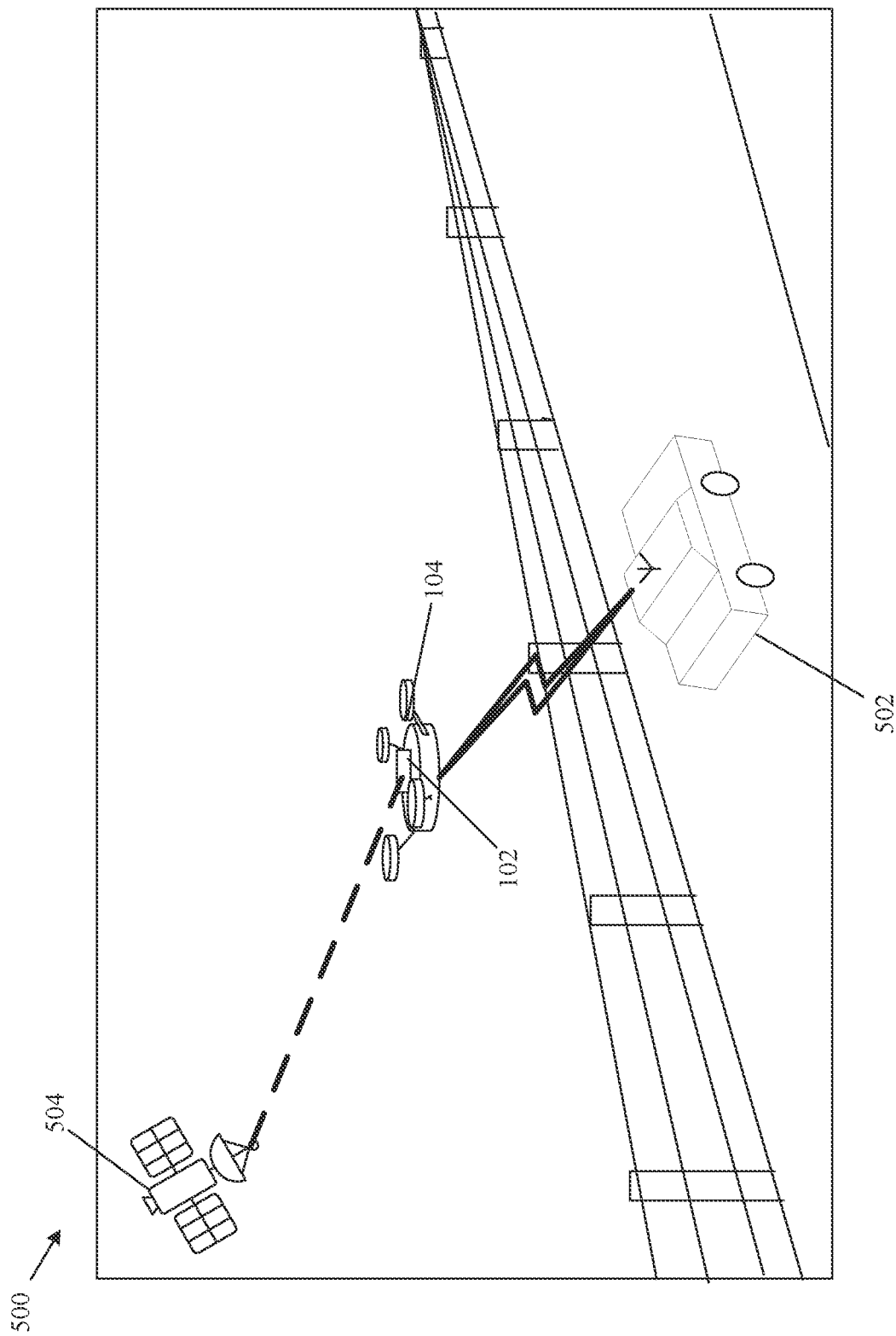
FIG. 5 is a diagram that illustrates an exemplary scenario for retransmission of signals using aerial vehicles, in accordance with an embodiment of the disclosure.

FIG. 5 is a diagram that illustrates an exemplary scenario for retransmission of signals using aerial vehicles, in accordance with an embodiment of the disclosure. FIG. 5 is described in conjunction with elements from FIGS. 1, 2, 3A, 3B, 3C, 4A, and 4B. With reference to FIG. 5, there is shown an exemplary scenario 500. The scenario 500 includes the vehicle 502 in the moving state. There is further shown the remote transmitter 504, which may be configured to have a functionality that may be similar to or same as that of the remote transmitter 106, illustrated and described in FIG. 1. It should be noted that the remote transmitter 504 in FIG. 5 is presented merely as an example and such an example should not be construed as limiting for the disclosure. The present disclosure may be applicable to other types of the remote transmitter 504, for example, a base station of a cellular network, a satellite's transponder, a terrestrial broadcast station, a Wi-Fi router, a Wi-Fi repeater, a repeater for a cellular network, a Bluetooth® transmitter, an optical transmitter that uses an optical signal for a point-to-point communication.

The controller 112 may be configured to control the movement of the first UAV 104 to the location within the signal coverage area associated with the remote transmitter 504, as described, for example, in FIG. 3B. The receiver circuitry 114 may be configured to receive a first signal from the remote transmitter 504 based on the location, as described, for example, in FIG. 3C. For example, the first signal may be a satellite signal may carry geolocation data, media content, or internet data as per a first wireless communication standard. The first wireless communication standard may support satellite signal communication over X band (8-12 GHz) or Ku band (12-18 GHz). The signal processor 116 may be configured to process the received first signal to obtain a second signal, as described, for example, in FIG. 3C. Thereafter, the transmission circuitry 118 may be configured to control the one or more antennas 120 disposed on the first UAV 104 to transmit a beam of the second signal to the electronic device 108 that includes one or more receivers, as described, for example, in FIG. 3C. The second signal may correspond to a second wireless communication standard such as a Wi-Fi standard which may be different from the first wireless communication standard used by the first signal. For example, instead of using the X-band or Ku-band, content of the first signal may be carried via a Wi-Fi signal (i.e., the second signal).

Figure 6:
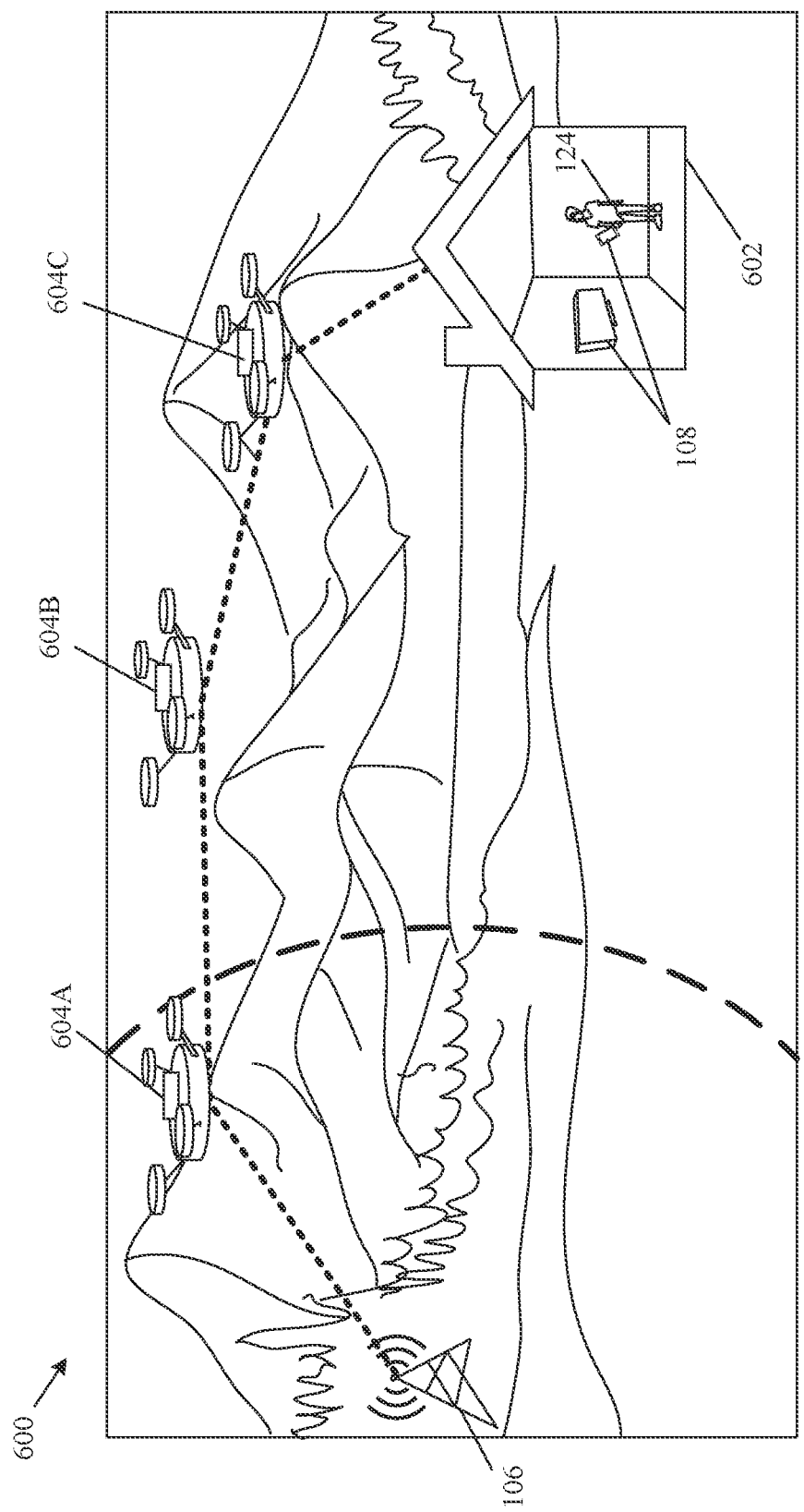
FIG. 6 is a diagram that illustrates an exemplary scenario for retransmission of signals using one or more aerial vehicles, in accordance with an embodiment of the disclosure.

FIG. 6 is a diagram that illustrates an exemplary scenario for retransmission of signals using one or more aerial vehicles, in accordance with an embodiment of the disclosure. FIG. 6 is described in conjunction with elements from FIGS. 1, 2, 3A, 3B, 3C, 4A, 4B, and 5. With reference to FIG. 6, there is shown an exemplary scenario 600. The scenario 600 includes a house 602 in a mountainous region. There is further shown a first UAV 604A, a second UAV 604B, and a third UAV 604C, each of which may be configured to have a functionality that may be similar to or same as that of the first UAV 104, illustrated and described in FIG. 1. For the sake of brevity, only three UAVs have been shown in FIG. 6. However, in some embodiments, there may be more than three UAVs, without a departure from the scope of the disclosure. There is further shown the remote transmitter 106, the electronic device 108, and the user 124. It should be noted that the electronic device 108 in FIG. 6 is presented merely as an example. The present disclosure may be applicable to other types of the electronic device 108.

As shown, for example, the electronic device 108 may be in a static state that may correspond to a fixed geo-location within a geographical area. For example, the electronic device 108 may be implemented as a television, a set top box, a mobile phone, and the like.

In an embodiment, a first electronic apparatus, a second electronic apparatus, and a third electronic apparatus may be disposed on the first UAV 604A, the second UAV 604B, and the third UAV 604C, respectively. The first electronic apparatus, the second electronic apparatus, and the third electronic apparatus may be configured to have a functionality that may be similar to or same as that of the electronic apparatus 102, illustrated and described in FIG. 1.

In FIG. 6, there is further shown a dashed curve that indicates a boundary of a signal coverage area associated with the remote transmitter 106. At any time-instant, the receiver circuitry 114 of the electronic apparatus 102 may detect one or more second UAVs (such as the first UAV 604A, the second UAV 604B, and the third UAV 604C) within a region that includes at least one of the remote transmitter (such as the remote transmitter 106) and the electronic device 108. A controller (such as the controller 112) associated with the first electronic apparatus, the second electronic apparatus, and the third electronic apparatus, may be configured to control a movement of the first UAV 604A, the second UAV 604B, and the third UAV 604C, respectively, such that the one or more second UAVs form a network or can collaborate to provide better signals to the one or more receivers. The first UAV 604A may be positioned at a location within a signal coverage area of the remote transmitter 106 to receive a first signal from the remote transmitter 106. Similarly, the third UAV 604C may be positioned at a location where the electronic device 108 is in LOS of the third UAV 604C so as to transmit to the electronic device 108. The second UAV 604B may be positioned between the first UAV 604A and the third UAV 604C to relay signal(s) from the first UAV 604A to the third UAV 604C or from the third UAV 604C to the first UAV 604A.

One or more receiver circuitries (such as the receiver circuitry 114) may be disposed on the first UAV 604A, the second UAV 604B, and the third UAV 604C, respectively, to receive a first signal. The first UAV 604A may receive a signal from the remote transmitter 106 and may transmit the received signal to the second UAV 604B. Similarly, the second UAV 604B may receive the signal from the first UAV 604A and may transmit the received signal to the third UAV 604C. Also, the third UAV 604C may receive the signal from the second UAV 604B and may transmit the signal to the electronic device 108. The first electronic apparatus, the second electronic apparatus, and the third electronic apparatus may together operate as a range extender disposed on the respective UAVs.

Transmission circuitry (such as the transmission circuitry 118) of the first electronic apparatus, the second electronic apparatus, and the third electronic apparatus may be configured to control the one or more antennas 120 disposed on the respective UAVs to transmit a beam of the second signal. The first signal (received by the first UAV 604A) may correspond to a first wireless communication standard. The signal processor 116 associated with the third electronic apparatus may be configured to process the first signal to obtain a second signal, which may be transmitted to the electronic device 108. The first signal may be processed such that the second signal corresponds to a second wireless communication standard which may be same as or different from the first wireless communication standard. In case the second wireless communication standard is same as the first wireless communication standard, the first electronic apparatus, the second electronic apparatus, and the third electronic apparatus (while disposed on respective UAVs) may operate as a signal re-transmitter.

In accordance with an embodiment, the controller 112 may be configured to receive multiple first signals at a time instant, and the signal processor 116 may be configured to process multiple signals for the one or more receivers associated with the electronic device 108 on the ground. After processing, the transmission circuitry 118 may be configured to transmit a beam of multiple second signals to the electronic device 108. As shown, for example, the received first signals may include a cellular signal that carries cellular communication data for a first receiver of the one or more receivers associated with the electronic device 108 (such as a mobile phone), and a radio frequency signal that carries the media content broadcasted by a terrestrial broadcast station for a second receiver of the one or more receivers associated with the electronic device 108 (such as a television).

The receiver circuitry 114 may be configured to detect one or more repeaters (not shown) within the region that includes at least one of the remote transmitters (the first remote transmitter 304 and the second remote transmitter 306) and the electronic device 108. The receiver circuitry 114 may be configured to include the detected one or more repeaters in the wireless communication network 110. As the received first signal may be weak, the one or more repeaters may be required to increase a power of the received first signal while ensuring that the gain in power is higher than the noise in the received first signal, thereby providing a better-quality signal.

Figure 7:
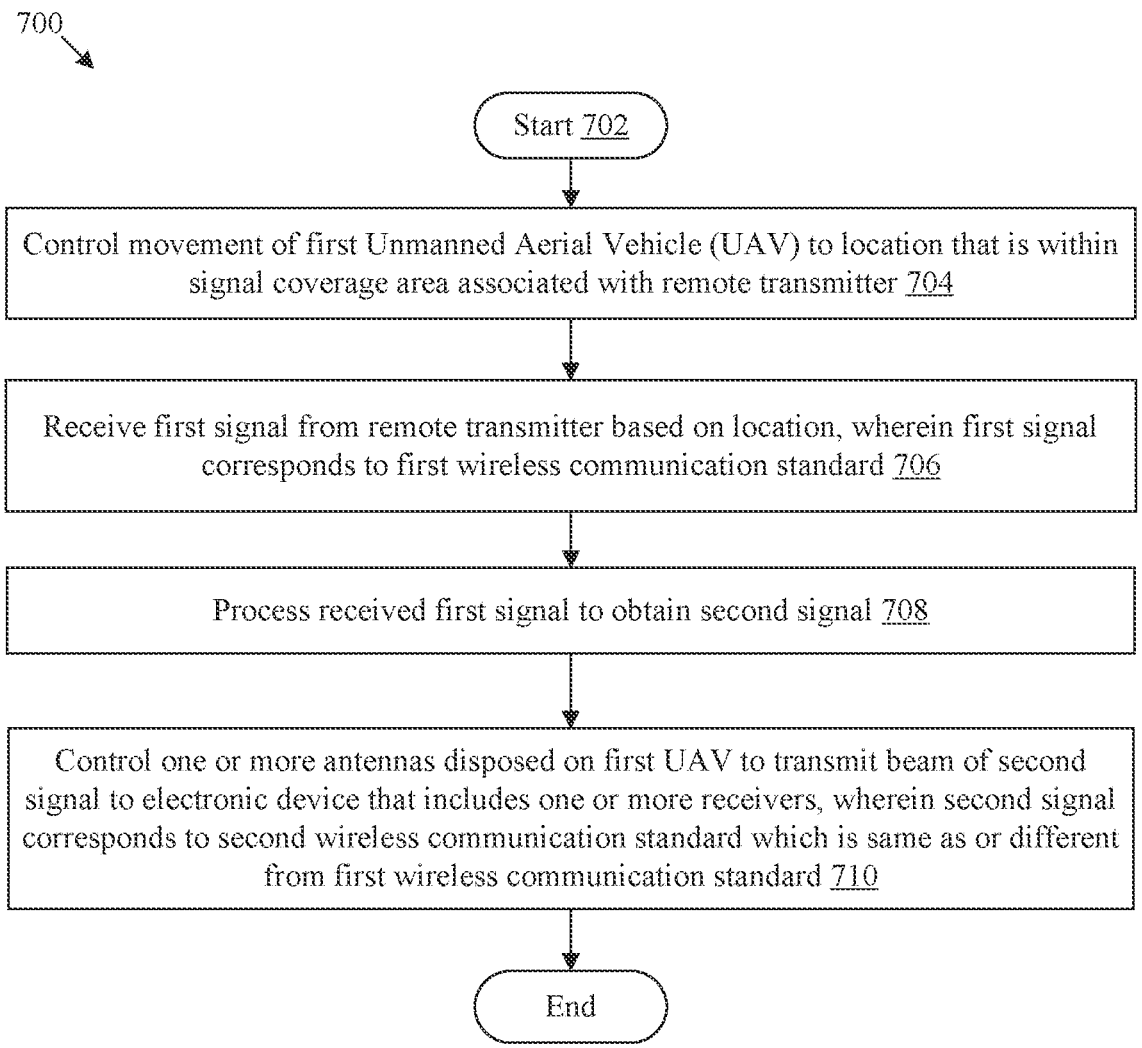
FIG. 7 is a flowchart that illustrates exemplary operations for retransmission of signals using aerial vehicles, in accordance with an embodiment of the disclosure.

FIG. 7 is a flowchart that illustrates exemplary operations for retransmission of signals using aerial vehicles, in accordance with an embodiment of the disclosure. FIG. 7 is described in conjunction with elements from FIGS. 1, 2, 3A, 3B, 3C, 4A, 4B, 5, and 6. With reference to FIG. 7, there is shown a flowchart 700. The flowchart 1000 may include operations from 702 to 710 and may be implemented by the electronic apparatus 102 of FIG. 1 or by the circuitry 202 of FIG. 2. The flowchart 700 may start at 702 and proceed to 704.

At 704, a movement of a first Unmanned Aerial Vehicle (UAV) may be controlled to a location that may be within a signal coverage area associated with the remote transmitter 106. In an embodiment, the controller 112 may be configured to control the movement of the first UAV 104, as described, for example, in FIG. 3B.

At 706, a first signal from the remote transmitter 106 may be received based on the location. In an embodiment, the receiver circuitry 114 may receive the first signal from the remote transmitter 106 based on the location. The first signal may correspond to a first wireless communication standard. The reception of the first signal is described, for example, in FIG. 3C.

At 708, the received first signal may be processed to obtain a second signal. In an embodiment, the signal processor 116 may process the first signal may be processed to obtain the second signal, as described, for example, in FIG. 3C.

At 710, the one or more antennas 120 disposed on the first UAV 104 may be controlled to transmit a beam of the second signal to the electronic device 108. In an embodiment, the transmission circuitry 118 may control the one or more antennas 120 disposed on the first UAV 104 to transmit a beam of the second signal to the electronic device 108 that includes one or more receivers. The second signal may correspond to a second wireless communication standard which may be same as or different from the first wireless communication standard. The control of one or more antennas 120 is described, for example, in FIG. 3C. Control may pass to end.

Although the flowchart 700 is illustrated as discrete operations, such as 704, 706, 708, and 710, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer readable medium and/or storage medium having stored thereon, instructions executable by a machine and/or a computer to operate an electronic apparatus (for example, the electronic apparatus 102). The instructions may cause the electronic apparatus 102 to perform operations that include control of a movement of a first Unmanned Aerial Vehicle (UAV) 104 to a location that is within a signal coverage area associated with a remote transmitter 106. The operations may further include retrieval of a first signal from the remote transmitter 106 based on the location. The first signal may correspond to a first wireless communication standard. The first signal is received in a first frequency band. The operations may further include process of the received first signal to obtain a second signal. The operations may further include control of one or more antennas 120 disposed on the first UAV 104 to transmit a beam of the second signal to an electronic device 108 that includes one or more receivers. The second signal may correspond to a second wireless communication standard which may be same as or different from the first wireless communication standard.

Exemplary aspects of the disclosure may provide an electronic apparatus (such as the electronic apparatus 102 of FIG. 1) that includes a controller (such as the controller 112) configured to control a movement of a first UAV (such as the first UAV 104) to a location within a signal coverage area associated with a remote transmitter (such as the remote transmitter 106). A receiver circuitry (such as the receiver circuitry 114) may be disposed on the first UAV 104. The receiver circuitry 114 may be configured to receive a first signal from the remote transmitter 106 based on the location. The first signal may correspond to a first wireless communication standard. A signal processor (such as the signal processor 116) may be configured to process the received first signal to obtain a second signal. A transmission circuitry (such as the transmission circuitry 118) may be configured to control one or more antennas (such as the one or more antennas 120) disposed on the first UAV 104, to transmit a beam of the second signal to an electronic device (such as the electronic device 108) that includes one or more receivers. The second signal may correspond to a second wireless communication standard which may be same as or different from the first wireless communication standard.

In an embodiment, the first signal may be at least one of a radio frequency (RF) signal or an optical signal.

In an embodiment, each of the first signal and the second signal may be one of a cellular signal that carries cellular communication data, a satellite signal that carries geolocation data or media content, a radio frequency signal that carries the media content broadcasted by a terrestrial broadcast station, a Wi-Fi signal, or a Bluetooth® signal In an embodiment, the remote transmitter 106 may be one of a base station of a cellular network, a satellite's transponder, a terrestrial broadcast station, a Wi-Fi router, a Wi-Fi repeater, a repeater for a cellular network, a Bluetooth® transmitter, an optical transmitter that uses an optical signal for a point-to-point communication.

In an embodiment, the first wireless communication standard may correspond to a first frequency band and the second wireless communication standard may correspond to a second frequency band that may be different from the first frequency band.

In an embodiment, the electronic device 108 may be in a static state that corresponds to a fixed geo-location within a geographical area.

In an embodiment, the electronic device 108 may be disposed inside or over a vehicle (such as the vehicle 302) that may be in a moving state.

In an embodiment, the controller 112 may be configured to receive speed information associated with the vehicle 302 from a data communication system associated with the vehicle 302. The controller 112 may be further configured to determine an expected position of the first UAV 104 with respect to that of the vehicle 302 at a time-instant. The controller 112 may be further configured to control the movement of the first UAV 104 until a difference between a current position of the first UAV 104 and the expected position is a minimum.

In an embodiment, the controller 112 may be configured to receive speed information associated with the vehicle 302 from a data communication system associated with the vehicle 302. The controller 112 may be further configured to determine an expected relative speed of the first UAV 104 with respect to the vehicle 302 at a time-instant and control the movement of the first UAV 104 until a difference in a current relative speed of the first UAV 104 and the expected relative speed is a minimum.

In an embodiment, the controller 112 may be configured to receive speed information associated with the vehicle 302 from a data communication system associated with the vehicle 302. The controller 112 may be further configured to determine an expected speed with which the vehicle 302 is required to move with respect to that of the first UAV 104. The transmission circuitry 118 may be further configured to transmit a message that includes a call to change a speed of the vehicle 302 to match the expected speed.

In an embodiment, the electronic device 108 is disposed in a location that includes a charging station (such as the charging station 402) and a battery charger coupled to the charging station 402.

In an embodiment, the controller 112 may be configured to determine a battery level of the first UAV 104. The controller 112 may be configured to generate notification information based on a determination that the battery level is below a threshold. The controller 112 may be further configured to transmit the generated notification information to the charging station 402.

In an embodiment, the electronic apparatus 102 further includes a charging circuitry (such as the charging circuitry 122). The charging circuitry 122 may be configured to receive a directed beam of optical energy from an optical power transmitter that is included in the battery charger and control a charging of one or more batteries that is included in the first UAV 104.

In an embodiment, the controller 112 may be configured to receive a response to the notification information from the charging station 402. The response may include a permission to dock the first UAV 104 at the charging station 402. The controller 112 may be further configured to control the movement of the first UAV 104 until the first UAV 104 is docked at the charging station 402.

In an embodiment, the electronic apparatus 102 further includes a charging circuitry 122. The charging circuitry 122 may be configured to receive electric power directly via cables from the battery charger coupled to the charging station 402. The electric power may be received based on a determination that the first UAV 104 is docked at the charging station 402.

In an embodiment, the receiver circuitry 114 may be further configured to detect one or more second UAVs within a region that includes at least one of the remote transmitter 106 and the electronic device 108. The receiver circuitry 114 may be further configured to establish a wireless communication network 110 among the detected one or more UAVs, the electronic device 108, and the electronic apparatus 102. The one or more antennas 120 may be controlled to transmit the beam of the second signal to the electronic device 108 through the wireless communication network.

In an embodiment, the receiver circuitry 114 may be further configured to detect one or more repeaters within the region that includes at least one of the remote transmitter and the electronic device 108. The receiver circuitry 114 may be further configured to include the detected one or more repeaters in the wireless communication network 110. In an embodiment, each of the first signal and the second signal may be an ATSC signal.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic apparatus, comprising:
a controller configured to:
receive speed information of a vehicle from a data communication system of the vehicle;
determine, based on the speed information, an expected position of a first Unmanned Aerial Vehicle (UAV) with respect to a position of the vehicle;
determine a current position of the first UAV:
determine a difference between the current position and the expected position is above a first threshold; and control, based on the determination that the difference between the current position and the expected position is above the first threshold, a movement of the first UAV to reduce the difference between the current position and the expected position,
  wherein the first UAV is within a signal coverage area of a remote transmitter;
a receiver circuitry mountable on the first UAV, wherein
  the receiver circuitry is configured to receive a first signal from the remote transmitter based on the first UAV that is within the signal coverage area of the remote transmitter, and
  the first signal corresponds to a first wireless communication standard;
a signal processor configured to process the received first signal to obtain a second signal; and
a transmission circuitry configured to control one or more antennas of the first UAV to transmit a beam of the second signal to an electronic device that includes one or more receivers, wherein
  the electronic device is one of mountable inside or mountable over the vehicle, and
  the second signal corresponds to a second wireless communication standard which is same as or different from the first wireless communication standard.

2. The electronic apparatus according to claim 1, wherein the first signal is at least one of a radio frequency (RF) signal or an optical signal.

3. The electronic apparatus according to claim 1, wherein each of the first signal and the second signal is one of:
  a cellular signal that carries cellular communication data,
  a satellite signal that carries geolocation data or media content,
  a radio frequency signal that carries the media content broadcasted by a terrestrial broadcast station,
  a Wi-Fi signal, or
  a Bluetooth® signal.

4. The electronic apparatus according to claim 1, wherein the remote transmitter is one of a base station of a cellular network, a satellite's transponder, a terrestrial broadcast station, a Wi-Fi router, a Wi-Fi repeater, a repeater for the cellular network, a Bluetooth® transmitter, an optical transmitter that uses an optical signal for a point-to-point communication.

5. The electronic apparatus according to claim 1, wherein the first wireless communication standard corresponds to a first frequency band and the second wireless communication standard corresponds to a second frequency band that is different from the first frequency band.

6. The electronic apparatus according to claim 1, wherein the controller is further configured to:
  determine, based on the speed information, an expected relative speed of the first UAV with respect to the vehicle;
  determine a current relative speed of the first UAV;
  determine a difference between the current relative speed and the expected relative speed is above a second threshold; and
  control, based on the determination that the difference between the current relative speed and the expected relative speed is above the second threshold, the movement of the first UAV to reduce the difference between the current relative speed and the expected relative speed.

7. The electronic apparatus according to claim 1, wherein
  the controller is further configured to determine an expected speed of the vehicle with which the vehicle is required to move with respect to the first UAV, and
  the transmission circuitry is further configured to transmit a message that includes a call to change a speed of the vehicle to match the expected speed.

8. The electronic apparatus according to claim 1, wherein the electronic device is in a location that includes a charging station and a battery charger coupled to the charging station.

9. The electronic apparatus according to claim 8, further comprising a charging circuitry configured to:
  receive a directed beam of optical energy from an optical power transmitter that is in the battery charger; and
  control, based on the received directed beam, a charging operation of one or more batteries that are in the first UAV.

10. The electronic apparatus according to claim 8, wherein the controller is further configured to:
  determine a battery level of the first UAV;
  generate notification information based on the battery level that is below a threshold; and
  transmit the generated notification information to the charging station.

11. The electronic apparatus according to claim 10, wherein the controller is further configured to:
  receive a response to the notification information from the charging station, wherein the response includes a permission to dock the first UAV at the charging station; and
  control, based on the received response, the movement of the first UAV to dock the first UAV at the charging station.

12. The electronic apparatus according to claim 11, further comprising a charging circuitry configured to receive, based on the first UAV that is docked at the charging station, electric power directly via cables from the battery charger coupled to the charging station.

13. The electronic apparatus according to claim 1, wherein
  the receiver circuitry is further configured to:
    detect one or more second UAVs within a region that includes at least one of the remote transmitter or the electronic device; and
    establish a wireless communication network among the detected one or more second UAVs, the electronic device, and the electronic apparatus, and
  the transmission circuitry is further configured to control the one or more antennas to transmit the beam of the second signal to the electronic device through the wireless communication network.

14. The electronic apparatus according to claim 13, wherein the receiver circuitry is further configured to:
  detect one or more repeaters within the region that includes the at least one of the remote transmitter or the electronic device; and
  include the detected one or more repeaters in the wireless communication network.

15. The electronic apparatus according to claim 1, wherein each of the first signal and the second signal corresponds to an Advanced Television Systems Committee (ATSC) standard.

16. An electronic apparatus, comprising:
  a controller configured to:
    receive speed information of a vehicle from a data communication system of the vehicle;

determine, based on the speed information, an expected position of a Unmanned Aerial Vehicle (UAV) with respect to a position of the vehicle;
determine a current position of the UAV;
determine a difference between the current position and the expected position is above a threshold; and
control, based on the determination that the difference between the current position and the expected position is above the threshold, a movement of the UAV to reduce the difference between the current position and the expected position,
  wherein the UAV is within a signal coverage area of a remote transmitter;
a receiver circuitry mountable on the UAV,
  wherein the receiver circuitry is configured to receive a first signal from the remote transmitter based on the UAV that is within the signal coverage area of the remote transmitter;
a signal processor configured to process the received first signal to obtain a second signal,
  wherein each of the first signal and the second signal corresponds to an Advanced Television Systems Committee (ATSC) standard; and
a transmission circuitry configured to control one or more antennas of the UAV to transmit a beam of the second signal to an electronic device that includes one or more receivers,
  wherein the electronic device is one of mountable inside or mountable over the vehicle.

17. A method, comprising:
receiving speed information of a vehicle from a data communication system of the vehicle;
determining, based on the speed information, an expected position of a Unmanned Aerial Vehicle (UAV) with respect to a position of the vehicle;
determining a current position of the UAV;
determining a difference between the current position and the expected position is above a threshold;
controlling, based on the determination that the difference between the current position and the expected position is above the threshold, a movement of the UAV to reduce the difference between the current position and the expected position,
  wherein the UAV is within a signal coverage area of a remote transmitter;
receiving a first signal from the remote transmitter based on the UAV that is within the signal coverage area of the remote transmitter,
  wherein the first signal corresponds to a first wireless communication standard;
processing the received first signal to obtain a second signal; and
controlling one or more antennas of the UAV to transmit a beam of the second signal to an electronic device that includes one or more receivers, wherein
  the electronic device is one of mountable inside or mountable over the vehicle, and
  the second signal corresponds to a second wireless communication standard which is same as or different from the first wireless communication standard.

* * * * *